United States Patent [19]

Picot et al.

[11] Patent Number: 4,629,842

[45] Date of Patent: Dec. 16, 1986

[54] ELECTRIC CONTACTOR FOR PNEUMATIC SERVOMOTOR FOR BRAKING

[75] Inventors: Pascal Picot, Bonneuil-sur-Marne; Pierre Pressaco, La Courneuve, both of France

[73] Assignee: Societe Anonyme D.B.A., Paris, France

[21] Appl. No.: 713,229

[22] Filed: Mar. 18, 1985

[30] Foreign Application Priority Data

Mar. 21, 1984 [FR] France ................. 84 04389

[51] Int. Cl.⁴ .................. B60Q 1/44; H01H 3/48
[52] U.S. Cl. ................. 200/153 V; 200/61.89; 200/82 D; 200/161; 200/302.2; 200/329
[58] Field of Search ............. 200/153 V, 161, 61.89, 200/81 R, 82 R, 82 D, 159 A, 159 R, 302.2, 329, 330, 331, 340, 283, 306, 303

[56] References Cited

U.S. PATENT DOCUMENTS

| | | | |
|---|---|---|---|
| 2,547,765 | 4/1951 | Lund | 200/335 |
| 3,258,549 | 6/1966 | Stoi | 200/153 V |
| 3,258,571 | 6/1966 | Schmidt | 200/283 |
| 3,293,849 | 12/1966 | Smith | 60/553 |
| 3,673,365 | 6/1972 | Schadow | 200/16 R |
| 3,681,551 | 8/1972 | Smith | 200/161 |
| 3,719,788 | 3/1973 | Holland et al. | 200/283 |
| 3,731,032 | 5/1973 | Schantz | 200/283 X |
| 3,965,311 | 6/1976 | Parolin | 200/153 V X |
| 4,037,316 | 7/1977 | Stoll | 200/303 X |
| 4,272,659 | 6/1981 | Orzel | 200/82 D |
| 4,467,160 | 8/1984 | Murmann et al. | 200/153 V X |

FOREIGN PATENT DOCUMENTS 2476577 8/1981 France.

*Primary Examiner*—Stephen Marcus
*Assistant Examiner*—Ernest G. Cusick
*Attorney, Agent, or Firm*—Larry J. Palguta; Ken C. Decker

[57] ABSTRACT

The contactor incorporates, in a cavity (70), a fixed contact blade (20) and a movable contact blade (21) pushed elastically away from the fixed contact blade (20) in the opposite direction to the direction in which the follower (13) is pushed, the follower (13) being capable of cooperating in thrust with the piston mechanism (2) of the casing of the servomotor in which the contactor is mounted, the movable contact blade being coupled to a plunger (15) mounted so as to slide in the follower (13) and incorporating a shoulder (16) which is capable of cooperating with an abutment (18) of the follower. The cavity (70) isoldated hermetically from the outside, communicates freely and permanently with the rear working chamber (4) of the servomotor through passages (12).

6 Claims, 1 Drawing Figure

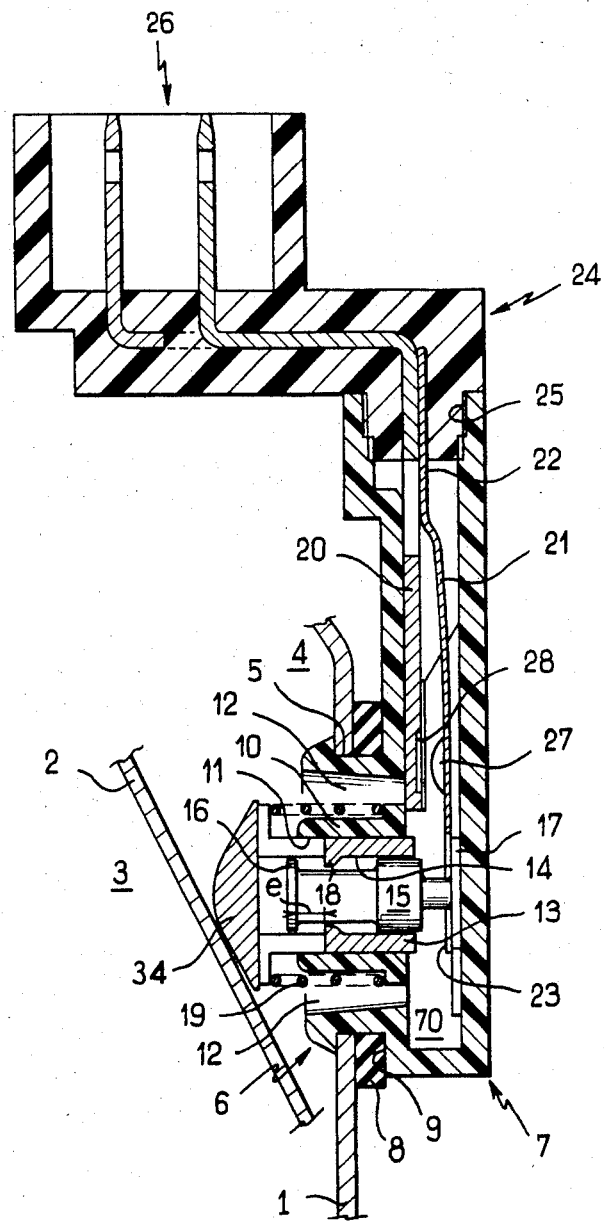

ELECTRIC CONTACTOR FOR PNEUMATIC SERVOMOTOR FOR BRAKING

BACKGROUND OF THE INVENTION

The present invention concerns electric contactors, intended to be joined to an electric circuit for warning of braking and to be mounted in sealed engagement in an opening in a rear wall of a pneumatic servomotor casing divided into a front chamber and a rear chamber intercommunicating selectively by a piston means capable of being displaced from a rest position close to the rear wall, the contactor being of the type incorporating a body made of plastic with a first body portion intended to be engaged in the opening in the rear wall of the servomotor casing and a second body portion situated outside the servomotor casing and enclosing at least one pair of electric contacts made of metal capable of being actuated by a follower which is mounted so as to slide in a bore in the first body portion and pushed by a spring towards the outside of this first body portion so as to bear normally against the piston means when the latter is in the region of its rest position.

An electric contactor for warning of braking of this type is described in the document FR-A-No. 2,476,577. In the document, the second body portion of the contactor, coaxial with the first mounting body portion, defines a cavity in which two connecting lugs terminate forming electric contacts which are capable of being joined selectively to one another electrically by a washer carried by the follower of the contactor, the washer/plunger assembly being pushed by a spring bearing, firstly on the bottom of the cavity, and secondly, on the washer. In such an arrangement, the dead travel of closure of the contacts is determined by the position of the piston means of the servomotor relative to the rear wall of its casing. However, in pneumatic servomotors for assisting with braking of the type being considered, the manufacture and assembly tolerances can cause large variations in the positioning of the piston means relative to the rear wall of the casing, which thus results in a large axial dimension of the cavity of the second body portion together with variable conditions of operation as regards establishing the closure of the electric contacts for the spring pushing the follower outwards and establishing the contact pressure of the washer upon the electric contacts.

SUMMARY OF THE INVENTION

The aim of the present invention is to propose an electric contactor of the type in question, of simple and robust construction, of reliable operation, enabling the establishing of instantaneous electric contacts to be ensured independently of the respective tolerances between the rear wall of the casing of the servomotor and the piston means of the latter.

To achieve this, according to a characteristic of the invention, the pair of electric contacts incorporates a fixed contact blade and a movable contact blade elastically pushed away from the fixed contact blade, in the opposite direction to the direction in which the follower is pushed, and coupled to a plunger mounted so as to slide in the follower and incorporating a shoulder capable of cooperating with an abutment component of the follower when the latter moves towards the outside of the first body portion.

With such an arrangement, the rest position of the movable contact blade/plunger assembly is determined independently of the rest position of the follower which is itself a function of the rest position of the piston means of the servomotor relative to the rear wall of the servomotor casing. In addition, since the movable contact blade is normally held elastically separated from the fixed contact blade, closure of the contacts does not take place until the follower has moved towards the outside of the first body portion by a determined distance and until the spring pushing it has overcome the elastic force pushing the movable contact blade, thus ensuring the establishing of an instantaneous electric contact, signalling an effective braking operation, between the two contact blades.

In the document FR-A-No. 2,476,577 mentioned above, the follower slides in a bore which is capable of establishing communication between the cavity of the second body portion of the contactor and the rear chamber of the servomotor casing in which the contactor is mounted. However, owing to the relatively accurate mounting of the follower in this bore and to the possible presence of lubricant on the follower or in the bore, there is no free communication between the cavity of the contactor and the rear chamber of the servomotor, following a similar approach, in this detail, to the arrangement described in the document U.S. Pat. No. 3,293,849 in which the contactor is completely isolated from the rear chamber of the servomotor by a sealing membrane.

Another aim of the present invention is to propose an electric contactor of the type defined above with improved reliability, enabling the establishing of instantaneous electric contacts in a rarefied atmosphere, limiting arc phenomena at the contacts, and thus limiting corrosion or oxidation of these contacts.

To achieve this, according to another characteristic of the invention, the contact blades are situated in a closed cavity formed in the second body portion which communicates freely with the rear chamber of the servomotor casing through passages formed in the first body portion.

In this way, the cavity of the contactor, enclosing the contact blades, is in permanent free communication with the rear chamber of the servomotor, which is typically in communication selectively with the front chamber, held under vacuum (normal rest configuration of the servomotor), or with the atmosphere, in order thus to cause movement of the piston means, during a braking operation. Thus, during a braking phase, the cavity of the contactor, initially in a rarefied atmosphere, fills gradually with atmospheric air; closure of the contacts nevertheless take place while the atmosphere is still rarefied, which thus ensures a considerably improved life of the contact.

Other characteristics and advantages of the present invention will emerge from the following description of an embodiment, given by way of illustration, with reference to the accompanying drawing, in which:

BRIEF DESCRIPTION OF THE DRAWING

The single FIGURE shows a view in longitudinal section of an electric contactor according to the invention mounted in position on the rear wall of a casing of a pneumatic servomotor for assisting with braking.

DESCRIPTION OF THE INVENTION

The FIGURE shows a portion of the rear wall 1 of a casing of a pneumatic servomotor for assisting with braking, divided internally by a piston means 2 into a front chamber, or vacuum chamber 3, and a rear chamber, or working chamber 4 between the piston means 2 and the rear wall 1. This rear wall 1 incorporates an opening 5 in which is mounted by elastic engagement a first body portion 6 of an electric contactor generally incorporating a second body portion 7 situated outside the rear wall 1 of the servomotor casing, the two body portions 6 and 7 being formed of a single piece made of plastic having a certain elasticity to enable the elastic engagement of the first body portion 6 in the opening 5 and to enable it to be held locked in position in the latter. As described in the document FR-A-No. 2,476,577, the first body portion 6 has a general cylindrical configuration and is provided on its periphery with an annular seal 8 intended, in the mounted configuration, to be compressed between the outer rear surface of the rear wall 1 and an annular shoulder 9 defined around the first body portion 6 by the front surface of the second body portion 7.

In accordance with the invention, the first body portion 6 incorporates a central portion 10 formed with a central bore 11 and around which are arranged several passages 12, angularly spaced, causing an internal cavity 70 of the second body portion 7 to communicate freely with the rear chamber 4 of the servomotor.

A follower 13 is mounted so as to slide in the bore 11, the follower 13 incorporating an end head 34 intended to bear against the rear surface of the piston means 2 of the servomotor. The follower 13 is formed internally with a central cylindrical housing 14, in which a portion of enlarged diameter of a plunger 15 slides, incorporating at its end adjacent to the head 34 of the follower 13 an annular flange 16, and at its opposite end, another annular flange 17, the two flanges 16 and 17 being joined to the portion of enlarged diameter of the plunger 15 by portions of reduced diameter. The follower 13 also incorporates an annular abutment 18 projecting radially inwards in the housing 14, capable of cooperating with the rear surface of the end flange or collar 16 of the plunger 15. The follower 13 is pushed towards the outside of the first body portion 6, in the direction towards the piston means 2, by a helical spring 19 mounted on the periphery of the central portion 10 and bearing, firstly, against an end shoulder of the central portion 10, and, secondly, against the rear surface of the head 34 of the follower 13.

According to a feature of the invention, a fixed contact blade 20, positioned on the front surface of the cavity 70 close to the rear wall 1 of the servomotor casing, and a movable contact blade 21, made of elastic metal and shaped in such a way as to lie, at rest, at an angle relative to the fixed contact blade 20 and separated from the latter, are mounted perpendicular to the plunger 15 in the rectangular cavity 70 of the second body portion 7 of the contactor. Typically, the movable contact blade 21 is mounted at its end 22 so as to overhang at a distance from the plunger 15, and its free end 23 is cut away in the shape of a U, and is engaged on the portion of reduced diameter between the portion of enlarged diameter of the plunger 15 and the end flange 23 in order to push the latter normally so as to bear against the rear surface of the cavity 70 under the effect of the elasticity inherent in the movable contact blade 21.

As shown in the single FIGURE, the movable contact blade 21 is advantageously bent at its end 22 in a cover or closing member 24 mounted and welded, for example by ultrasonic welding, in the opposite enlarged end 25 of the cavity 70 from the first body portion 6 in such a way as to close this cavity 70 in a sealed manner, the cover 24 incorporating electrical components 26 for connecting the contact blades 20 and 21 to an electric circuit for warning of braking (not shown). Preferably, the movable contact blade 21 is provided with a hemispherical zone for establishing contact 27 intended to cooperate with a hollow contact zone 28 of the fixed contact 20.

As shown in the single FIGURE, in the rest configuration of the servomotor/electric contactor assembly, the follower 13 is at least partially retracted inside the first body portion 6, against the spring 19, under the effect of the piston means 2 brought back via other means (not shown) into its rest position in the servomotor casing. In this configuration, the plunger 15 also occupies its rest position with its flange 17 bearing against the rear surface of the cavity 70 under the effect of the elastic force of the movable contact blade 21 which is well separated from the fixed contact blade 20. It will be observed that in this rest configuration, there exists between the end collar 16 of the plunger 15 and the annular abutment 18 of the follower 13 a clearance e which can vary by considerable amounts and can thus accommodate the positioning tolerances at rest between the piston means 2 and the rear wall 1 of the servomotor casing, without modifying, however, the rest position of the movable contact blade 21 plunger 15 assembly. On the other hand, in operation when the piston means 2 is moved away from the rear wall 1 under the effect of the admission of atmospheric air into the rear working chamber 4, the follower 13 follows the movement of the piston means 2, eliminating firstly the dead travel e then driving, by its annular internal abutment 18, the plunger 15 until it comes to press the contact point 27 of the movable blade 21 against the fixed contact blade 20 against the elastic force inherent in the movable contact blade 21. It will be understood that the spring 19 is dimensioned in such a way, that in the fully extended configuration of the follower 13 outside the first body portion 6, its final force is about double the elastic force inherent in the movable contact blade 21 tending to separate the latter from the fixed contact blade 20. As mentioned above, the cavity 70 being hermetically closed as regards the surrounding atmospheric air but communicating freely with the rear chamber 4 of the servomotor through the various passages 12, closure of the contacts 21 and 20 (27, 28) takes place when a rarefied atmosphere exists in the cavity 70. In normal operation, the contacts in question are held closed while atmospheric air is held in the rear chamber 4 (and the cavity 70). On the other hand, reopening of the contacts takes place when the piston means 2 returns close to its rest position, that is to say with the rear chamber 4 (and therefore the cavity 70) once again in communication with the vacuum in the front chamber 3, which thus ensures not only the closure but also the opening of the contacts in a rarefied atmosphere only slightly oxidizing and free from humidity.

We claim:

1. In a braking assistance pneumatic servomotor having a casing divided internally into a front chamber and a rear chamber by a movable wall capable of being displaced from a rest position close to a rear wall of said casing, an electric switch actuator device intended to be joined to an electric warning circuit and including a first body portion sealingly engaged in an opening in the rear wall of the casing and a second body portion outside the casing and enclosing at least one pair of metallic electrical contacts actuatable by a follower slideably mounted in a bore in the first body portion, the follower biased by a spring in a direction away from the first body portion so as to bear in contact engagement with the movable wall when the movable wall is approximately in the rest position, characterized in that the device comprises a fixed contact blade and a movable contact blade associated with the pair of contacts, the movable contact blade having resilient means for biasing the movable contact blade away from the fixed contact blade in a direction opposite the direction the follower is biased by the spring, the movable contact blade coupled to a plunger slideably mounted in the follower, the plunger having a shoulder for cooperating in driving engagement with an abutment part of the follower when the follower moves away from the first body portion under the biasing force of the spring, the movement of the follower bringing the movable contact blade into contact with the fixed contact blade and against the biasing force of said resilient means, the contact blades arranged in a closed cavity formed in the second body portion which communicates freely with the rear chamber of the servomotor through fluid passages formed in the first body portion, and the passages formed around a central portion of the first body portion in which is formed said bore.

2. The device according to claim 1, characterized in that the cavity is closed in a sealed manner at an end opposite the first body portion by a closing member fixed to the second body portion and including electrical connection means for connection of the contact blades to the electric warning circuit.

3. The device according to claim 2, characterized in that the resilient means comprises elasticity of the movable contact blade which is mounted at one end in the closing member and extends, when at rest, from said one end at an angle relative to the fixed contact blade.

4. The device according to claim 3, characterized in that the plunger is slidably received in a central recess of the follower which has the abutment part projecting radially inwardly, the plunger comprising an end flange against which a free end of the movable contact blade bears in contact engagement.

5. The device according to claim 4, characterized in that the shoulder of the plunger is formed by an annular flange formed at an end of the plunger opposite the end flange.

6. The device according to claim 1, characterized in that the first body portion is provided with a peripheral annular seal compressed between the rear wall of the casing and an annular shoulder formed by the second body portion.

* * * * *